United States Patent
Creamer et al.

(10) Patent No.: US 7,266,182 B2
(45) Date of Patent: Sep. 4, 2007

(54) METHOD AND SYSTEM FOR IMPLEMENTING A TELEPHONY SERVICES FEATURE USING VOICE XML

(75) Inventors: Thomas E. Creamer, Boca Raton, FL (US); Peeyush Jaiswal, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/172,264

(22) Filed: Jun. 14, 2002

(65) Prior Publication Data

US 2003/0231747 A1 Dec. 18, 2003

(51) Int. Cl.
*H04M 1/64* (2006.01)
(52) U.S. Cl. .................... 379/88.17; 307/352
(58) Field of Classification Search ......... 379/88.17, 379/88.18, 88.13; 370/353, 354
See application file for complete search history.

(56) References Cited

U.S. PATENT DOCUMENTS

| | | | |
|---|---|---|---|
| 5,892,950 A | 4/1999 | Rigori et al. ............... 395/705 |
| 5,915,001 A * | 6/1999 | Uppaluru ................. 379/88.22 |
| 6,108,629 A | 8/2000 | Kasday | |
| 6,122,363 A | 9/2000 | Friedlander et al. ........ 379/230 |
| 6,134,618 A | 10/2000 | Hebert ....................... 710/105 |
| 6,349,132 B1 | 2/2002 | Wesemann et al. | |
| 6,385,583 B1 | 5/2002 | Ladd et al. | |
| 6,421,674 B1 * | 7/2002 | Yoakum et al. ............... 707/10 |
| 6,546,430 B2 * | 4/2003 | Gray et al. .................. 719/310 |
| 6,922,411 B1 * | 7/2005 | Taylor ........................ 370/401 |
| 2001/0040886 A1 * | 11/2001 | Jimenez et al. ............. 370/352 |
| 2002/0093944 A1 * | 7/2002 | Shen et al. .................. 370/352 |

OTHER PUBLICATIONS

B. Lucas, VoiceXML for Web-Based Distributed Conversational Applications, *Communications of the ACM*, vol. 43, No. 9, pp. 53-57, (Sep. 2000).
T. Ball, et al., Speech-Enabled Services Using TelePortal™ Software and VoiceXML,*Przeglad Telekomunikacyjny + Wiadomosci Telekomunicayjne*, vol. 74, No. 3, pp. 207-215, (2001).
S. Vujosevic, et al., VoxML: Get Your Database Talking, *WEB Techniques*, vol. 6, No. 2, pp. 51-55, (Feb. 2001).

* cited by examiner

*Primary Examiner*—Fan Tsang
*Assistant Examiner*—Simon Sing
(74) *Attorney, Agent, or Firm*—Akerman Senterfitt

(57) ABSTRACT

A method of implementing telephony services can include receiving a call from a telephony switch and matching the received call to a voice markup language document implementation of a telephony service. The voice markup language document can be retrieved from a data store. The received call can be processed in accordance with the retrieved voice markup language document thereby implementing the telephony service.

18 Claims, 2 Drawing Sheets

METHOD AND SYSTEM FOR IMPLEMENTING A TELEPHONY SERVICES FEATURE USING VOICE XML

BACKGROUND OF THE INVENTION

1. Technical Field

The invention relates to the field of telephony, and more particularly, to a call processing architecture for providing telephony services and features.

2. Description of the Related Art

Telecommunication companies continually create new telephony services and/or features (collectively "services") to be offered to subscribers. The development of a new telephony service is a costly and time consuming task. Because telephony services traditionally have been implemented on the telephony switch level, the development of new services typically requires specialized personnel having a significant amount of experience in programming the particular telephony switch upon which the service is to be implemented. In addition, the low level manner in which a telephony service is implemented requires developers not only to have knowledge of the telephony switch, but also significant knowledge and understanding of various underlying telecommunications protocols and call processing functions. After development, highly trained personnel again are needed to identify and isolate problems, as well as to ensure that the telephony service functions properly and does not interfere with other telephony services.

The development of telephony services is further complicated by the fact that telephony switches often employ proprietary internal protocols and operating systems. Thus, while a developer may be knowledgeable regarding one particular type of telephony switch, that developer typically cannot implement the same feature on another type of telephony switch with any degree of efficiency. The proprietary nature of telephony switches serves to limit the number of available developers for a given telephony switch, thereby increasing the cost of developing telephony services. Further adding to the cost of telephony service development, is that telephony services are not easily ported over from one type of telephony switch to another. In consequence, similar and like features must be redesigned for each telephony switch.

SUMMARY OF THE INVENTION

The invention disclosed herein provides a solution for developing telephony services in a cost effective and timely manner. Rather than developing proprietary switch level telephony services, according to the present invention, telephony services can be developed using standardized scripting languages. The use of a scripting language, such as Voice Extensible Markup Language (VXML), for the development of telephony services expands the available pool of telephony service developers beyond only those persons having experience with telephony protocols, call processing, and/or telephony switch specific programming techniques. In consequence, Web designers and others who may be familiar with scripting languages and markup language development techniques can develop telephony services.

One aspect of the present invention can include a method of implementing a telephony service feature. The method can include receiving a call from a telephony switch and matching the received call to a voice markup language document implementation of a telephony service feature. For example, a called directory number can be identified from the received call. The directory number can be matched to a network location of the voice markup language document. Notably, the directory number can be registered for the voice markup language document implementation of the telephony service. The called directory number and the network location of the voice markup language document can be provided to a session manager.

The voice markup language document can be retrieved from a data store. For example, the network location can be provided to a voice markup language parser which can retrieve the voice markup language document from the specified network location. The voice markup language parser can parse the voice markup language document into an intermediate format which can be provided to the session manager. The received call can be processed in accordance with the retrieved voice markup language document to implement the telephony service. In particular, the parsed voice markup language document can be provided to a service processor for executing the voice markup language document.

Another aspect of the present invention can include a method of implementing a telephony service including registering one or more directory numbers with at least one voice markup language document implementation of a telephony service. The directory numbers can be associated with network locations of the voice markup language documents. The method further can include receiving a call from one of the directory numbers and identifying network locations for the voice markup language document implementations of telephony services for which the calling directory number has been registered. The voice markup language document implementations of telephony services for which the calling directory number has been registered can be retrieved from the identified network locations and then executed to process the received call.

Another aspect of the present invention can include a system for implementing a telephony service feature. The system can include a call processor unit configured to receive calls. The call processor unit can include one or more addresses of voice markup language document implementations of telephony services associated with one or more directory numbers. The system also can include a voice markup language parser configured to retrieve voice markup language documents from the specified addresses and parse the voice markup language documents responsive to receiving the calls.

The system further can include a service processor configured to execute the parsed voice markup language documents to implement the telephony service feature, and at least one session manager configured to coordinate the operation of the voice markup language parser and the service processor. Notably, the call processor unit further can include an interface to the service processor. The interface can be configured to perform bridge service functions and can be transaction capabilities application part (TCAP) enabled. The voice markup language parser and the service processor each can be configured to run within an independent virtual machine such as a Java virtual machine. Additionally, the voice markup language parser, the service processor, and the session manager each can be located in a separate computing machine, for example distributed throughout a network. A data store including the voice markup language documents also can be included in the system as well as a server being communicatively linked to the data store and the voice markup language parser. The server can facilitate the retrieval of the voice markup language documents. Additionally, a cache memory can be included. The cache memory can be disposed between the session manager and the voice markup language parser. The cache memory can be configured to store frequently retrieved voice markup language documents to improve system performance.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a call processing architecture which facilitates the use of standardized scripting language implementations of telephony services. In particular, the present invention can provide an environment in which a scripting language, such as Voice Extensible Markup Language (VXML), can be used for the development of telephony services, thereby alleviating the need for developers to understand telephony protocols and/or switches. According to the invention, received directory numbers can be correlated to voice markup language scripts, which when executed, implement particular telephony services. As the telephony services are coded in a scripting language such as VXML, the telephony services can be written by developers having little or no knowledge of telephony protocols and/or switching functions. Moreover, the VXML application data can be developed using standard Web developing tools.

Figure 1:
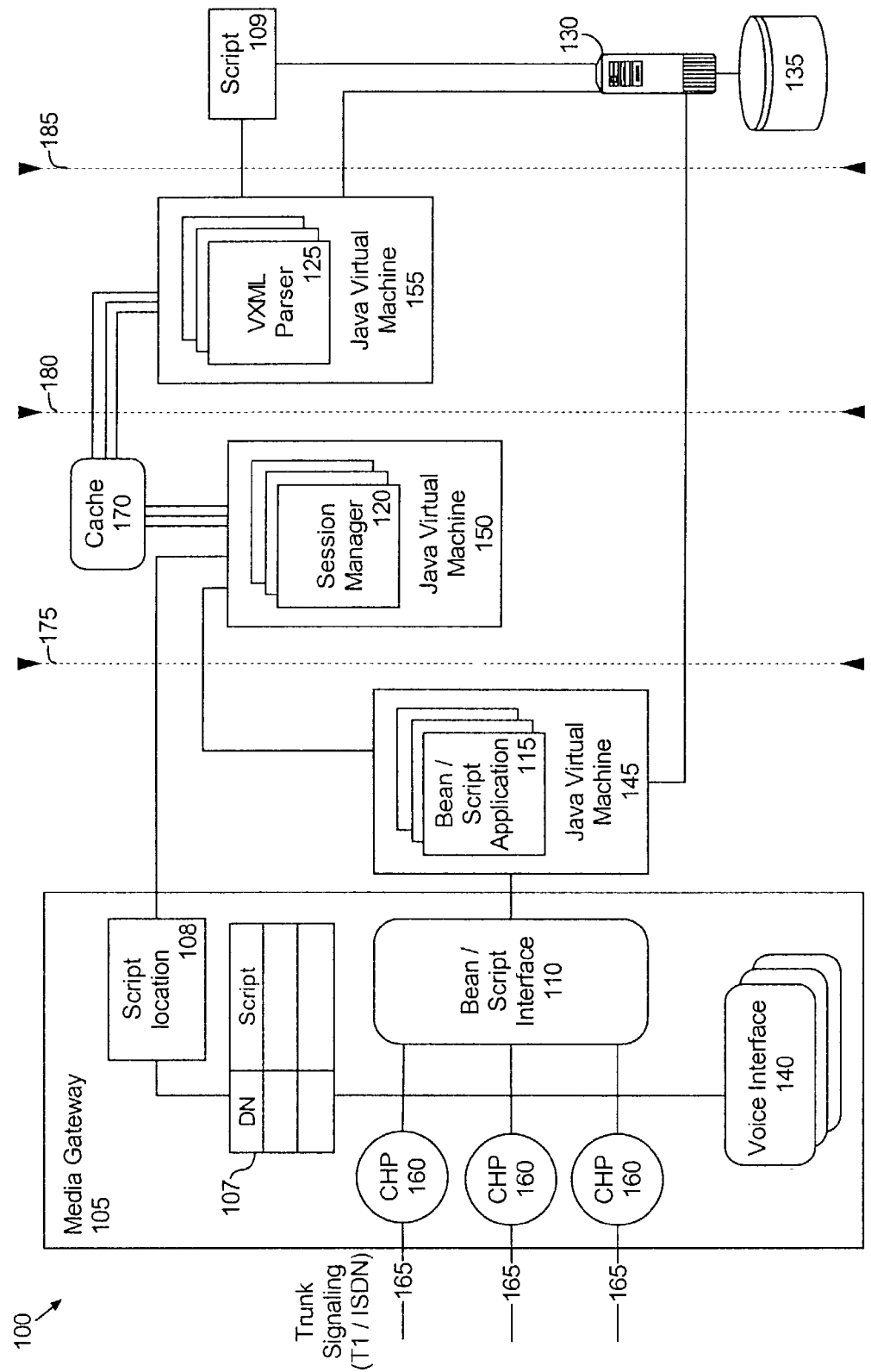
FIG. 1 is a schematic diagram illustrating an exemplary system for implementing a telephony service feature in accordance with the inventive arrangements disclosed herein.

FIG. 1 is a schematic diagram illustrating an exemplary system 100 for implementing a telephony service and/or feature (hereinafter "service") in accordance with the inventive arrangements disclosed herein. As shown in FIG. 1, the system 100 can include a media gateway 105, bean/script applications (service processors) 115, session managers 120, VXML parsers 125, a hyper-text transfer protocol (HTTP) server 130, and a data store 135. The data store 135 can include one or more VXML scripts specifying documents, audio, text, and the like. The VXML scripts, for example script 109, are script implementations of telephony services. The VXML scripts within the data store 135 can be accessed via the HTTP server 130. It should be appreciated that although the data store 135 is depicted as a single data store, it can be implemented as one or more distributed data stores.

The media gateway 105 can be communicatively linked to one or more telecommunication trunk lines 165 such as T1 lines and/or ISDN lines. Each incoming telecommunication trunk line 165 can be interfaced with a channel processor 160 serving as an interface between the media gateway 105 and the telecommunications trunk line 165. One channel processor 160 can be included for each voice circuit of a corresponding telephony switch. The media gateway 105 also can include an application table 107 and a bean/script interface 110. The application table 107 can specify associations between dialed number inbound services (DNIS), hereinafter referred to as directory numbers, and the VXML script implementations of telephony services stored in data store 135. More specifically, the application table 107 maintains a listing of directory numbers and telephony services for which the directory numbers have been registered. The application table 107 further specifies network locations from which the various VXML script implementations of the telephony services can be retrieved.

Accordingly, upon receiving an incoming call, the media gateway 105 can determine the directory number specified by the incoming call. The directory number can be matched to one or more VXML scripts using the application table 107. Thus, the locations or addresses of the VXML script implementations of the telephony services for which the directory number has been registered can be identified. The locations of the VXML scripts of the telephony services can be provided to the session managers 120.

The bean/script interface 110, which can include bridge services or functions for connecting one local area network (LAN) to another LAN, can be included in the media gateway 105. The bean/script interface 110 can facilitate communications between the service processors 115 and the other components of the media gateway 105 such as the channel processors 160 and the voice interface 140. The bean/script interface 110 can be configured to support the range of functionality that can be provided through the VXML scripts as interpreted by the service processors 115 to be discussed herein. In particular, as the VXML scripts can support extended call control and transaction capabilities application part (TCAP) functions, the bean/script interface 110 also can be configured to support those call control and TCAP functions. The voice interface 140 can provide speech recognition as well as text-to-speech (TTS) functions. Accordingly, speech received via the telecommunications trunk lines 165 can be converted to text, and text data can be converted to an audio stream to be provided to one or more subscribers via the telecommunications trunks 165.

Taken together, the service processors 115, the session managers 120, and the VXML parsers 125, provide the components of a distributed voice browser. The VXML parsers 125 can be instantiated at runtime and can retrieve the VXML scripts from the data store 135 via the HTTP server 130. The VXML parsers 125 can convert the retrieved VXML scripts into an intermediate format which can be mapped to, and interpreted by, the service processors 115. Notably, the VXML scripts can be enhanced to include new tags defining TCAP transactions such as Allow Call, Block Call, Forward Call, Selective Forward Call, and Bridge Call. Accordingly, the VXML parser 125 also can be configured to identify any additional tag enhancements to the VXML scripts.

The service processors 115 can be reusable software components which can be combined with other components in the same or different computer system in a distributed computing environment. One service processor 115 can be instantiated at runtime for each channel processor 160, and thus, can be associated with that particular channel processor. The service processors 115 effectively serve as interpreters which provide the execution environment for the parsed VXML scripts to implement the telephony services specified by the VXML scripts. Accordingly, the service processors 115 match the internal functionality of the media gateway 105 with the parsed VXML script representation of the telephony service. As shown, the service processors 115 can be communicatively linked to the voice interface 140 of the media gateway 105. Thus, the service processors 115 can access TTS and speech recognition functions for implementing the telephony service as specified by the parsed VXML script. For example, text and recognized speech can be used to populate fields of a VXML script, form, and/or document.

Notably, the service processors 115 and the VXML parsers 125 can execute within Java virtual machines 145 and 155 respectively. Although FIG. 1 depicts a plurality of service processors 115 and VXML parsers 125 executing within single Java virtual machines 145 and 155, each of the service processors 115 and the VXML parsers 125 can execute within an individual Java virtual machine thereby minimizing the risk that an error occurring within one program will adversely affect another.

Each of the service processors 115 and the VXML parsers 125 can register with the session managers 120. Accordingly, the session managers 120 can track which service processors 115 and VXML parsers 125 are available for call processing. The session managers 120 further can coordinate the operation of a service processor 115/VXML parser 125 pair. The session manager 120 can pass information between service processors 115 and VXML parsers 125. In particular, requests provided to the session managers 120 from the media gateway 105 can include the called directory number, one or more universal resource identifiers (URI), including universal resource locators (URLs), specifying one or more VXML script representations of telephony services, and an identifier representing the particular channel processor upon which the call was received. The session managers 120 can save the information in a local data store. Accordingly, the session managers 120 can determine a free VXML parser 125 to which the received URI can be provided. Additionally, results from the VXML parsers 125 can be provided back to the proper service processor 115 according to the saved URI, called directory number, and channel processor identifier.

As was the case with the service processors 115 and the VXML parsers 125, a plurality of session managers 120 can execute within a single Java virtual machine, or each session manager 120 can execute within an individual Java virtual machine. In any case, as mentioned, the service processors 115, the session managers 120, and the VXML parsers 125 can exist in separate computing machines distributed throughout a computing network. Further, these various components can be replicated as needed to support increased processing loads. In consequence, the service processors 115, the session managers 120, and the VXML parsers 125, when taken together, provide a distributed voice browser architecture which can be scaled to support a large volume of system requests.

A cache memory 170 can be disposed between the session managers 120 and the VXML parsers 125. The cache memory 170 can increase system performance by reducing multiple fetching and parsing of frequently used VXML scripts. The inventive arrangements disclosed herein further can include one or more firewalls 175, 180, and 185. Although firewalls are not necessary for operation of the system 100 as disclosed herein, the addition of the firewalls provides added network security. In particular, firewalls 175 and 180 provide double firewall protection as required by many telecommunications companies. Firewall 185 can provide isolation of the VXML parsers 125 from corporate or other private networks.

Figure 2:
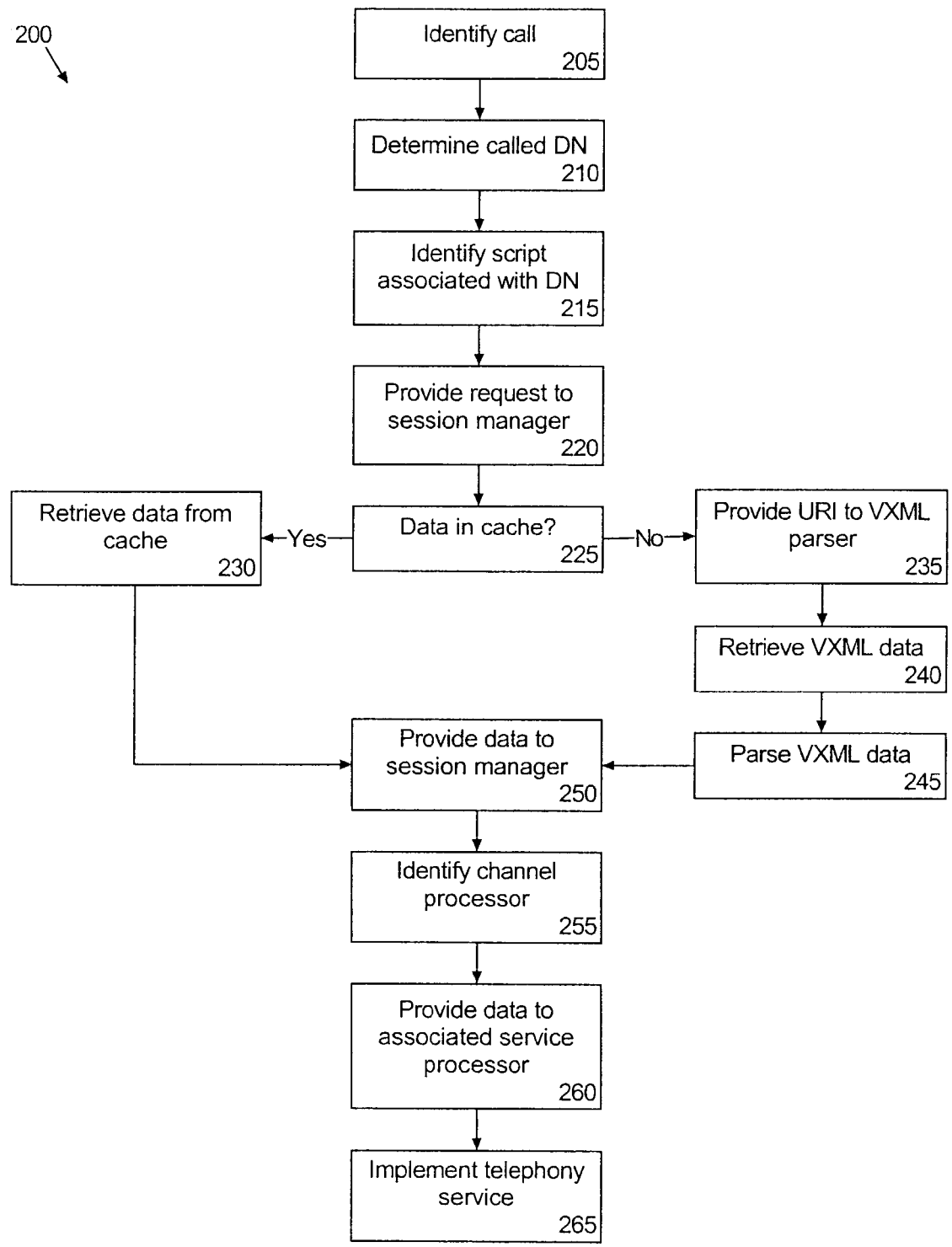
FIG. 2 is a flow chart illustrating a method of implementing a telephony service feature as performed by the system of FIG. 1.

FIG. 2 is a flow chart illustrating a method 200 of implementing a telephony service feature as performed by the system of FIG. 1. The method 200 can begin in a state wherein the system of FIG. 1 has instantiated at least one service processor for each channel processor of the media gateway. Additionally, one or more parsers, such as VXML parsers, can be instantiated such that the service processors and the parsers have registered with the session managers. Notably, there need not be a one to one correspondence between the service processors and the parsers. In any event, a telephony switch can receive a call. The telephony switch can select a free channel processor of the media gateway and query the media gateway to accept the call, for example using inband signaling or ISDN D-channel. Responsive to the media gateway accepting the call, the telephony switch can apply the call to the chosen channel processor. Accordingly, in step 205, the call can be identified by the media gateway. In step 210, the called directory number of the received call can be determined.

In step 215, one or more call processing scripts that are associated with the determined directory number can be identified. For example, the listing of called directory numbers and associated VXML scripts can be consulted to determine the particular call processing scripts, or VXML script representations of telephony services, for which the directory number has been registered. In step 220, the media gateway can send at least the following information to the session manager via a TCP/IP connection: the called directory number, one or more URIs specifying call processing script representations of telephony services for which the directory number has been registered, and an identifier representing the particular channel processor upon which the call was received.

Prior to transmitting the URI to an available parser, as shown in step 225, the session manager can query the cache memory via a TCP/IP connection to determine whether the call processing script specified by the URI is contained within the cache memory. If so, the call processing script has already been parsed by the parser and exists in an intermediate format which maps to the service processors. Accordingly, the parsed call processing script can be retrieved from the cache memory in step 230 and the method can continue to step 250. If, however, the cache memory does not include the call processing script specified by the URI, the method can continue to step 235.

In step 235, the session manager can identify an available parser and provide the URI to the parser through a TCP/IP connection. Notably, the session manager can save a local copy of the channel processor identifier. In step 240, the parser can issue an HTTP request to an HTTP server to retrieve the call processing script specified by the URI. The call processing script can include, for example, voice markup language scripts such as VXML documents, text, scripts, as well as selected portions of audio. In step 245, the parser can receive the requested call processing script via an HTTP connection. The parser then can parse the call processing script, converting the call processing script into an intermediate format which can be interpreted by the service processors.

In step 250, the parsed call processing script can be transmitted from the parser to the session manager via a TCP/IP connection. The session manager, in step 255, having retained the channel processor identifier, can identify a service processor (script/bean) associated with the channel processor that received the call. In step 260, the session manager can transmit the parsed call processing script to the identified service processor. Accordingly, the service processor can implement the telephony service by executing the parsed call processing script. In step 265, the service processors can access any required functionality, such as the voice processor of the media gateway, via the bean/script interface to implement the telephony service.

The invention disclosed herein provides a solution for developing telephony services in a cost effective and timely manner that is neither telephony switch specific nor dependent upon a developer's knowledge of telephony protocols. The present invention enables one having knowledge of Web applications and VXML to implement telephony service features. The present invention also can provide significant improvement with regard to the time needed for telephony service development over conventional switch level development techniques.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of implementing a public switched telephone network (PSTN) telephony service within a PSTN, the method comprising:
    tracking an availability of a plurality of paired voice markup language parsers and service processors, said tracking based upon a registering of said plurality of paired parsers and service processors with a session manager;
    receiving at a media gateway a call from a PSTN telephony switch, said media gateway connected directly to the PSTN via at least one circuit-switched connection;
    matching said received call at said media gateway to a voice markup language for implementing said PSTN telephony service, said matching based upon a dialed number inbound service (DNIS) of the received call;
    selecting an available one of the plurality of paired parsers and service processors for call processing;
    retrieving said voice markup language document from a data store at said media gateway;
    executing said retrieved voice markup language document to determine at least one PSTN functionality for implementing said PSTN telephony service; and
    conveying said functionality to at least one channel processor of the PSTN in a format usable by said at least one PSTN channel processor to implement said PSTN telephony service entirely within said PSTN without routing the call thorough a data communications network.

2. The method of claim 1, wherein said DNIS defines a called directory number, and wherein the method further comprises
    matching said directory number to a network location of said voice markup language document, wherein said directory number has been registered for said voice markup language document implementation of said PSTN telephony service.

3. The method of claim 2, further comprising:
    transmitting said called directory number and said network location of said voice markup language document to said session manager.

4. The method of claim 3, said retrieving step further comprising:
    providing said network location to a voice markup language parser of the selected one of the plurality of paired parsers and processors;
    said parser retrieving said voice markup language document from said network location;
    parsing said voice markup language document into an intermediate format; and
    providing said parsed voice markup language document to said session manager.

5. The method of claim 4, said processing step further comprising:
    providing said parsed voice markup language document to a service processor of the selected one of the plurality of paired parsers and processors for executing said voice markup language document.

6. A system for implementing a public switched telephone network (PSTN) telephony service within a PSTN, the system comprising:
    a call processor unit connected directly to the PSTN via at least one circuit-switched connection and configured to receive circuit-switched calls from the PSTN, said call processor unit having a plurality of addresses of voice markup language documents for implementing PSTN telephony services associated with a plurality of directory numbers;
    a plurality of voice markup language parsers configured to retrieve said voice markup language documents from said addresses and parse said voice markup language documents responsive to receiving said calls;
    a plurality of service processors configured to execute said parsed voice markup language documents to determine at least one PSTN functionality for implementing said PSTN telephony service, wherein a one of the plurality of service processors is paired with a one of the plurality of voice markup language parsers;
    a PSTN channel processor configured to receive the at least one PSTN functionality from said plurality of service processors for implementing said PSTN telephony service entirely within said PSTN without routing the call through a data communications network; and
    at least one session manager configured to coordinate operation of said plurality of voice markup language parsers and said plurality of service processors for parsing and executing said voice markup language document,
    wherein said at least one session manager is configured to select a currently available one of the plurality of paired parsers and service processors to parse and execute said voice markup language document, wherein said at least one session manager is configured to track a current availability of ones of the plurality of paired parsers and service processors currently registered with said at least one session manager, and wherein said at least one session manager is configured to pass information between a voice markup language parser and a service processor of the selected one of the plurality of paired parsers and service processors.

7. The system of claim 6, said call processing unit further comprising:
an interface to each one of said plurality of service processors, wherein said interface is configured to perform bridge service functions.

8. The system of claim 7, wherein said interface is transaction capabilities application part enabled.

9. The system of claim 6, wherein said plurality of voice markup language parsers, said plurality of service processors, and said at least one session manager are each disposed in a separate computing machines.

10. The system of claim 6, wherein said plurality of voice markup language parsers and said plurality of service processors run within separate and independent virtual machines.

11. The system of claim 10, further comprising:
a data store including said voice markup language documents.

12. The system of claim 11, further comprising:
a server communicatively linked to said data store and said plurality of voice markup language parsers for facilitating the retrieval of said voice markup language documents.

13. The system of claim 12, further comprising:
a cache memory disposed between said plurality of session managers and said plurality of voice markup language parsers configured to store frequently retrieved voice markup language documents.

14. A machine-readable storage, having stored thereon a computer program having a plurality of code sections executable by a machine for causing the machine to perform the steps of:
tracking an availability of a plurality of paired voice markup language parsers and service processors, said tracking based upon a registering of said plurality of pair parsers and service processors with a session manager;
receiving at a media gateway a call from a PSTN telephony switch, said media gateway connected directly to the PSTN via at least one circuit-switched connection;
matching said received call at said media gateway to a voice markup language for implementing said PSTN telephony service, said matching based upon a dialed number inbound service (DNIS) of the received call;
identifying an available one of the plurality of paired parsers and service processors for call processing;
retrieving said voice markup language document from a data store at said media gateway;
executing said retrieved voice markup language document to determine at least one PSTN functionality for implementing said PSTN telephony service; and
conveying said functionality to at least one channel processor of the PSTN in a format usable by said at least one PSTN channel processor to implement said PSTN telephony service entirely within said PSTN without routing the call thorough a data communications network.

15. The machine-readable storage of claim 14, wherein said DNIS defines a called directory number, and further comprising:
matching said directory number to a network location of said voice markup language document, wherein said directory number has been registered for said voice markup language document implementation of said PSTN telephony service.

16. The machine-readable storage of claim 15, further comprising:
transmitting said called directory number and said network location of said voice markup language document to said session manager.

17. The machine-readable storage of claim 16, said retrieving step further comprising:
providing said network location to a voice markup language parser of the selected one of the plurality of paired parsers and service processors;
said parser retrieving said voice markup language document from said network location;
parsing said voice markup language document into an intermediate format; and
providing said parsed voice markup language document to said session manager.

18. The machine-readable storage of claim 17, said processing step further comprising:
providing said parsed voice markup language document to a service processor of the selected one of the plurality of pair parsers and service processors for executing said voice markup language document.

* * * * *